(12) United States Patent
Han et al.

(10) Patent No.: US 9,910,531 B2
(45) Date of Patent: Mar. 6, 2018

(54) CIRCULAR OUTLINE SINGLE LAYER PATTERN

(71) Applicant: SYNAPTICS INCORPORATED, San Jose, CA (US)

(72) Inventors: Sang Chul Han, San Jose, CA (US); Derek Solven, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/733,572

(22) Filed: Jun. 8, 2015

(65) Prior Publication Data
US 2016/0202826 A1   Jul. 14, 2016

Related U.S. Application Data

(60) Provisional application No. 62/102,179, filed on Jan. 12, 2015.

(51) Int. Cl.
| | |
|---|---|
| *G06F 3/044* | (2006.01) |
| *G06F 3/041* | (2006.01) |
| *G06F 1/16* | (2006.01) |
| *G06F 3/0354* | (2013.01) |

(52) U.S. Cl.
CPC .............. *G06F 3/0416* (2013.01); *G06F 1/16* (2013.01); *G06F 3/03547* (2013.01); *G06F 3/044* (2013.01); *G06F 3/0412* (2013.01)

(58) Field of Classification Search
CPC ........ G06F 3/044; G06F 3/077; G06F 3/0412; G06F 3/0416
See application file for complete search history.

(56) References Cited

U.S. PATENT DOCUMENTS

| | | | |
|---|---|---|---|
| 5,736,865 A | 4/1998 | Nelson et al. | |
| 7,372,281 B2* | 5/2008 | Morimoto | G01D 5/2417 324/661 |
| 7,466,307 B2* | 12/2008 | Trent, Jr. | G06F 3/03547 345/156 |
| 7,502,016 B2 | 3/2009 | Trent, Jr. et al. | |
| 7,710,126 B2* | 5/2010 | Morimoto | G01D 5/2417 324/661 |
| 7,786,981 B2 | 8/2010 | Proctor | |
| 7,932,897 B2* | 4/2011 | Elias | G06F 3/044 345/174 |
| 8,416,198 B2* | 4/2013 | Rathnam | G06F 3/03547 345/156 |
| 8,440,920 B2 | 5/2013 | Bulea et al. | |

(Continued)

*Primary Examiner* — Ricardo L Osorio
(74) *Attorney, Agent, or Firm* — Patterson + Sheridan, LLP

(57) ABSTRACT

A circular, single-layer sensor electrode pattern for input devices, such as wearable devices, is described. The sensor electrode pattern features transmitter electrodes and receiver electrodes tiled in alternating fashion, such that each receiver electrode is surrounded by transmitter electrodes. The individual sensor electrodes of the described pattern are designed to provide a substantially uniform electrode area size across the sensor. Additionally, the sensor electrode pattern is arranged to be symmetric across both horizontal and vertical axes. The provided characteristics of the sensor electrode pattern leads to a sensor structure having uniform absolute capacitive sensing measurements for all sensor electrodes as well as uniform transcapacitive sensing measurements for all "pixels."

22 Claims, 4 Drawing Sheets

(56) References Cited

U.S. PATENT DOCUMENTS

| | | | | |
|---|---|---|---|---|
| 8,446,370 B2* | 5/2013 | Zadesky | ............... | G06F 1/1626 |
| | | | | 345/156 |
| 8,514,185 B2* | 8/2013 | Hotelling | ................ | G06F 3/044 |
| | | | | 345/156 |
| 8,537,132 B2* | 9/2013 | Ng | ...................... | G06F 3/03547 |
| | | | | 345/156 |
| 8,619,058 B2* | 12/2013 | Ito | ...................... | G06F 3/03547 |
| | | | | 178/18.01 |
| 8,816,967 B2* | 8/2014 | Lyon | ...................... | G06F 3/044 |
| | | | | 178/18.06 |
| 8,912,930 B2* | 12/2014 | Hu | ........................ | G06F 3/0202 |
| | | | | 178/18.01 |
| 9,354,751 B2* | 5/2016 | Fisher | .................. | G06F 3/0416 |
| 9,454,256 B2* | 9/2016 | Fisher | .................. | G06F 1/1626 |
| 2004/0080216 A1* | 4/2004 | Morimoto | ............... | G01L 1/142 |
| | | | | 307/125 |
| 2005/0110768 A1* | 5/2005 | Marriott | .............. | G06F 3/03547 |
| | | | | 345/173 |
| 2006/0227117 A1* | 10/2006 | Proctor | ................ | G06F 3/0416 |
| | | | | 345/173 |
| 2008/0084394 A1* | 4/2008 | Kang | .................... | G06F 3/0338 |
| | | | | 345/166 |
| 2008/0088597 A1* | 4/2008 | Prest | ..................... | G06F 3/0338 |
| | | | | 345/173 |
| 2016/0156099 A1* | 6/2016 | Kim | ..................... | H01Q 21/061 |
| | | | | 342/359 |

* cited by examiner

_US 9,910,531 B2_

CIRCULAR OUTLINE SINGLE LAYER PATTERN

CROSS-REFERENCE TO RELATED APPLICATIONS

This application claims benefit of U.S. Provisional Patent Application No. 62/102,179, filed Jan. 12, 2015, entitled "Circular Border Single Layer Pattern" which is incorporated by reference herein.

BACKGROUND

Field of the Disclosure

Embodiments generally relate to input sensing and, in particular, to a sensing device having a circular electrode design for capacitance sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Embodiments of the present disclosure provide a capacitive sensor. The capacitive sensor includes a sensor substrate and a plurality of sensor electrodes that are disposed on a first side of the sensor substrate and are arranged in a symmetric circular pattern. The plurality of sensor electrodes comprises an inner circle of sensor electrodes and an outer ring of sensor electrodes disposed radially outward from the inner circle of sensor electrodes. The plurality of sensor electrodes are configured to sense an input object in a sensing region of the capacitive sensor. Each of the plurality of sensor electrodes has a substantially equal surface area.

Another embodiment of the present disclosure provides a capacitive sensor device. The capacitive sensor device includes a sensor substrate, and a plurality of sensor electrodes that are disposed on a first side of the sensor substrate and are arranged in a symmetric circular pattern. The plurality of sensor electrodes are configured to sense an input object in a sensing region of the capacitive sensor device. Each of the plurality of sensor electrodes has a substantially equal surface area. The capacitive sensor device further includes a processing system communicatively coupled to the plurality of sensor electrodes. The processing system is configured to perform mutual capacitive sensing by driving a sensing signal on a first subset of sensor electrodes of the plurality of sensor electrodes and receiving a resulting signal on a second subset of sensor electrodes of the plurality of sensor electrodes. The processing system is also configured to perform absolute capacitive sensing with the plurality of sensor electrodes. Each of the sensor electrodes from the first subset of sensor electrodes shares a border with sensor electrodes of the second subset of sensor electrodes.

Embodiments of the present disclosure further provide a processing system for a touch screen device. The processing system includes a sensor module communicatively coupled to a plurality of sensor electrodes. The plurality of sensor electrodes are disposed on a first side of a sensor substrate and are arranged in a symmetric circular pattern. The plurality of sensor electrodes are configured to sense an input object in a sensing region of the touch screen device. Each of the plurality of sensor electrodes has a substantially equal surface area. The sensor module is configured to drive a sensing signal on a first subset of sensor electrodes of the plurality of sensor electrodes, and receive a resulting signal on a second subset of sensor electrodes of the plurality of sensor electrodes. Each of the sensor electrodes from the first subset of sensor electrodes shares a border with sensor electrodes of the second subset of sensor electrodes.

BRIEF DESCRIPTION OF THE DRAWINGS

So that the manner in which the above recited features of embodiments can be understood in detail, a more particular description of embodiments, briefly summarized above, may be had by reference to embodiments, some of which are illustrated in the appended drawings. It is to be noted, however, that the appended drawings illustrate only typical embodiments and are therefore not to be considered limiting of scope, for other effective embodiments may be admitted.

To facilitate understanding, identical reference numerals have been used, where possible, to designate identical elements that are common to the figures. It is contemplated that elements of one embodiment may be beneficially incorporated in other embodiments.

DETAILED DESCRIPTION

The following detailed description is merely exemplary in nature and is not intended to limit the embodiments or the application and uses of such embodiments. Furthermore, there is no intention to be bound by any expressed or implied theory presented in the preceding technical field, background, brief summary or the following detailed description.

Various embodiments provide a circular, single-layer sensor electrode pattern for input devices, such as wearable devices. The sensor electrode pattern features transmitter electrodes and receiver electrodes tiled in alternating fashion, such that each "receiver" electrode is surrounded by "transmitter" electrodes. The individual sensor electrodes of the described pattern are designed to provide a substantially uniform electrode area size across the sensor. Additionally, the sensor electrode pattern is arranged to be symmetric across both horizontal and vertical axes. The provided characteristics of the sensor electrode pattern leads to a sensor structure having uniform absolute capacitive sensing measurements for all sensor electrodes as well as uniform transcapacitive sensing measurements for all "pixels."

Compared to traditional single-layer sensor patterns, the described embodiments provide improved performance for capacitive sensing along the circular edge of the sensor device. Furthermore, using the described sensor electrode pattern, the number and arrangement of sensor electrodes allow for a narrower border area around the sensor pattern for side trace routing, as well as reduced size of a bonding area for coupling the sensor to a processing system, for example, such as anisotropic conductive film (ACF).

Figure 1:
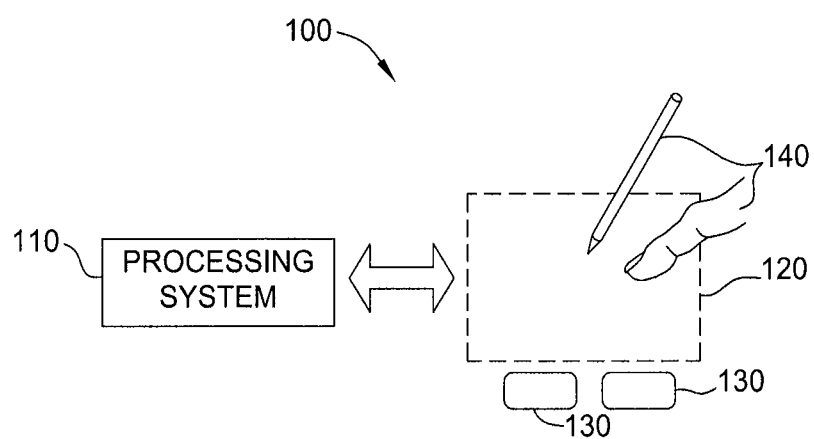
FIG. 1 is a block diagram of a system that includes an input device according to an example.

Turning now to the figures, FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. In some embodiments, the sensing region 120 has a circular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques. Some implementations are configured to provide images that span one, two, three, or higher dimensional spaces. Some implementations are configured to provide projections of input along particular axes or planes. In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
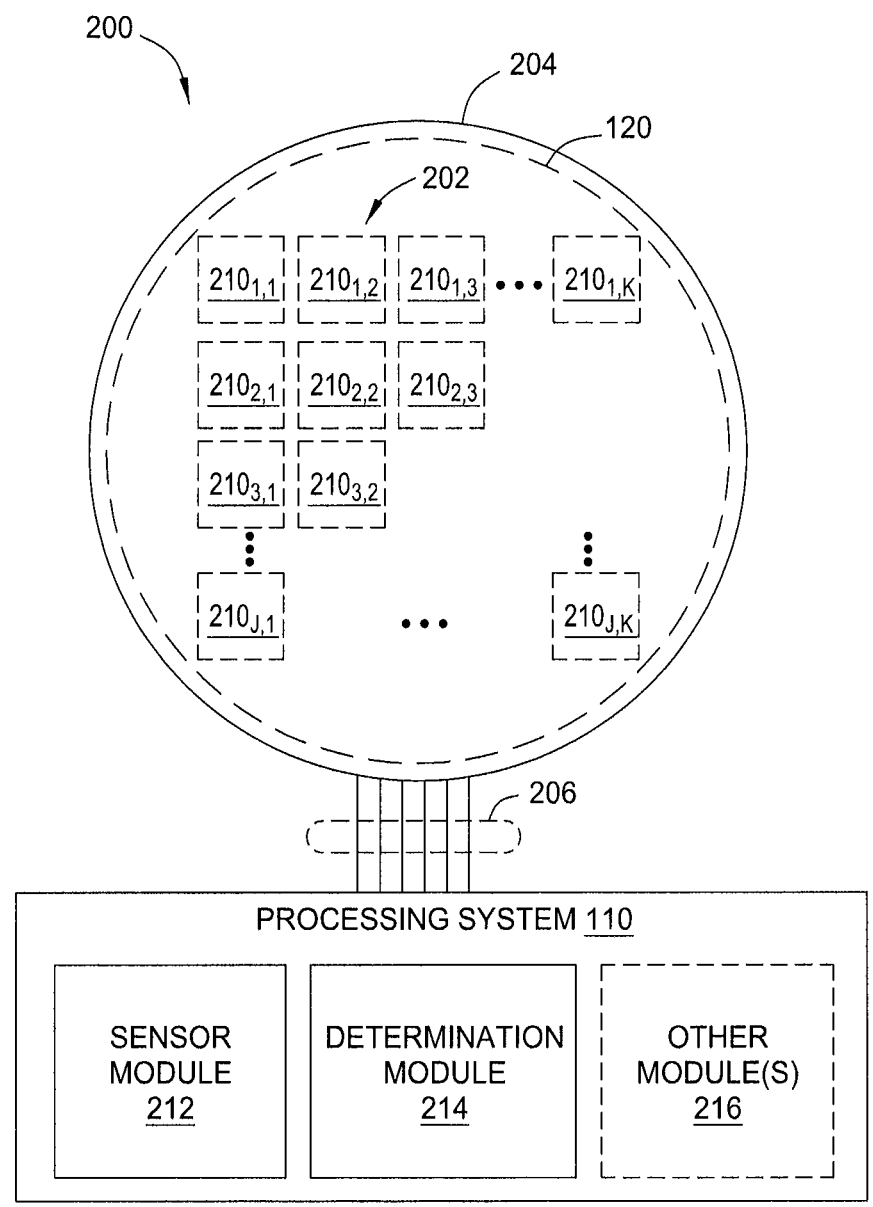
FIG. 2 is a block diagram depicting a capacitive sensor device according to an embodiment of the present disclosure.

FIG. 2 is a block diagram depicting a capacitive sensor device 200 according to an embodiment of the present disclosure. The capacitive sensor device 200 comprises an example implementation of the input device 100 shown in FIG. 1. The capacitive sensor device 200 includes a sensor electrode pattern 202 coupled to an example implementation of the processing system 110. The sensor electrode pattern 202 is disposed on a substrate 204 to provide the sensing region 120. The sensor electrode pattern 202 includes a plurality of sensor electrodes $210_{J,K}$ (referred to collectively as sensor electrodes 210) disposed on the substrate 204. In the present example, the sensor electrode pattern 202 includes the plurality of sensor electrodes 210 disposed in a rectangular matrix, specifically, arranged in J rows and K columns, where J and K are positive integers, although one or J and K may be zero. For clarity of illustration and description, FIG. 2 presents the sensing elements in a matrix of rectangles and does not show various components in detail, such as various interconnects between the processing system 110 and the sensing elements. Detailed sensor electrode patterns are described later in conjunction with FIGS. 3 and 4.

The sensor electrodes 210 are typically ohmically isolated from one another. Additionally, where a sensor electrode 210 includes multiple sub-electrodes, the sub-electrodes may be ohmically isolated from each other. In one embodiment, all of the sensor electrodes 210 can be disposed on a single layer of the substrate 204. While the sensor electrodes are shown disposed on a single substrate 204, in some embodiments, the sensor electrodes can be disposed on more than one substrate. For example, some sensor electrodes can be disposed on a first substrate, and other sensor electrodes can be disposed on a second substrate adhered to the first substrate.

The processing system 110 is coupled to the sensor electrodes 210 through the conductive routing traces 206 to implement the sensing region 120 for sensing inputs. Each of the sensor electrodes 210 can be coupled to at least one routing trace of the routing traces 206. The processing system 110 can also be coupled to a grid electrode through one or more routing traces (not shown for clarity). The processing system 110 is coupled to the sensor electrodes 210 through the conductive routing traces 206 to implement the sensing region 120 for sensing inputs.

The capacitive sensor device 200 can be utilized to communicate user input (e.g., a user's finger, a probe such as a stylus, and/or some other external input object) to an electronic system (e.g., computing device or other electronic device). For example, the capacitive sensor device 200 can be implemented as a capacitive touch screen device that can be placed over an underlying image or information display device (not shown). In this manner, a user would view the underlying image or information display by looking through substantially transparent elements in the sensor electrode pattern 202. When implemented in a touch screen, the substrate 204 can include at least one substantially transparent layer (not shown). The sensor electrodes and the conductive routing traces can be formed of substantially transparent conductive material. Indium tin oxide (ITO) and/or thin, barely visible wires are but two of many possible examples of substantially transparent material that can be used to form the sensor electrodes and/or the conductive routing traces. In other examples, the conductive routing traces can be formed of non-transparent material, and then hidden in a border region (not shown) of the sensor electrode pattern 202.

In another example, the capacitive sensor device 200 can be implemented as a capacitive touchpad, slider, button, or other capacitance sensor. For example, the substrate 204 can be implemented with, but not limited to, one or more clear or opaque materials. Likewise, clear or opaque conductive materials can be utilized to form sensor electrodes and/or conductive routing traces for the sensor electrode pattern 202.

In general, the processing system 110 excites or drives sensing elements of the sensor electrode pattern 202 with a sensing signal and measures an induced or resulting signal that includes the sensing signal and effects of input in the sensing region 120. The terms "excite" and "drive" as used herein encompasses controlling some electrical aspect of the driven element. For example, it is possible to drive current through a wire, drive charge into a conductor, drive a substantially constant or varying voltage waveform onto an electrode, etc. A sensing signal can be constant, substantially constant, or varying over time, and generally includes a shape, frequency, amplitude, and phase. A sensing signal can be referred to as an "active signal" as opposed to a "passive signal," such as a ground signal or other reference signal. A sensing signal can also be referred to as a "transmitter signal" when used in transcapacitive sensing, or an "absolute sensing signal" or "modulated signal" when used in absolute sensing.

In an example, the processing system 110 drives sensing element(s) of the sensor electrode pattern 202 with a voltage and senses resulting respective charge on sensing element(s). That is, the sensing signal is a voltage signal and the resulting signal is a charge signal (e.g., a signal indicative of accumulated charge, such as an integrated current signal). Capacitance is proportional to applied voltage and inversely proportional to accumulated charge. The processing system 110 can determine measurement(s) of capacitance from the sensed charge. In another example, the processing system 110 drives sensing element(s) of the sensor electrode pattern 202 with charge and senses resulting respective voltage on sensing element(s). That is, the sensing signal is a signal to cause accumulation of charge (e.g., current signal) and the resulting signal is a voltage signal. The processing system 110 can determine measurement(s) of capacitance from the sensed voltage. In general, the term "sensing signal" is meant to encompass both driving voltage to sense charge and driving charge to sense voltage, as well as any other type of signal that can be used to obtain indicia of capacitance. "Indicia of capacitance" include measurements of charge, current, voltage, and the like, from which capacitance can be derived.

The processing system 110 can include a sensor module 212 and a determination module 214. The sensor module 212 and the determination module 214 comprise modules that perform different functions of the processing system 110. In other examples, different configurations of one or more other modules 216 can perform the functions described herein. The sensor module 212 and the determination module 214 can include circuitry and can also include firmware, software, or a combination thereof operating in cooperation with the circuitry.

The sensor module 212 selectively drives sensing signal(s) on one or more sensing elements of the sensor electrode pattern 202 over one or more cycles ("excitation cycles") in accordance with one or more schemes ("excitation schemes"). During each excitation cycle, the sensor module 212 can selectively sense resulting signal(s) from one or more sensing elements of the sensor electrode pattern 202. Each excitation cycle has an associated time period during which sensing signals are driven and resulting signals measured.

In one type of excitation scheme, the sensor module 212 can selectively drive sensing elements of the sensor electrode pattern 202 for absolute capacitive sensing. In absolute capacitive sensing, the sensor module 212 can measure voltage, charge, or current on sensor electrode(s) 210 to obtain resulting signals indicative of a capacitance between the sensor electrode(s) 210 and an input object. In such an excitation scheme, measurements of absolute capacitance between the selected sensing element(s) and input object(s) are determined from the resulting signal(s).

In another type of excitation scheme, the sensor module 212 can selectively drive sensing elements of the sensor electrode pattern 202 for transcapacitive sensing. In transcapacitive sensing, the sensor module 212 drives selected transmitter sensor electrodes with transmitter signal(s) and senses resulting signals from selected receiver sensor electrodes. In such an excitation scheme, measurements of transcapacitance between transmitter and receiver electrodes are determined from the resulting signals. In an example, the sensor module 212 can drive selected sensor electrodes 210 with transmitter signal(s), and receive resulting signals from others of the sensor electrodes 210.

In any excitation cycle, the sensor module 212 can drive sensing elements of the sensor electrode pattern 202 with other signals, including reference signals and guard signals. That is, those sensing elements of the sensor electrode pattern 202 that are not driven with a sensing signal, or sensed to receive resulting signals, can be driven with a reference signal, a guard signal, or left floating (i.e., not driven with any signal). A reference signal can be a ground signal (e.g., system ground) or any other constant or substantially constant voltage signal. A guard signal can be a signal that is similar or the same in at least one of shape, amplitude, frequency, or phase of a transmitter signal.

"System ground" may indicate a common voltage shared by system components. For example, a capacitive sensing system of a mobile phone can, at times, be referenced to a system ground provided by the phone's power source (e.g., a charger or battery). The system ground may not be fixed relative to earth or any other reference. For example, a mobile phone on a table usually has a floating system ground. A mobile phone being held by a person who is strongly coupled to earth ground through free space may be grounded relative to the person, but the person-ground may be varying relative to earth ground. In many systems, the system ground is connected to, or provided by, the largest area electrode in the system. The capacitive sensor device 200 can be located proximate to such a system ground electrode (e.g., located above a ground plane or backplane).

The determination module 214 performs capacitance measurements based on resulting signals obtained by the sensor module 212. The capacitance measurements can include changes in capacitive couplings between elements (also referred to as "changes in capacitance"). For example, the determination module 214 can determine baseline measurements of capacitive couplings between elements without the presence of input object(s). The determination module 214 can then combine the baseline measurements of capacitive couplings with measurements of capacitive couplings in the presence of input object(s) to determine changes in capacitive couplings.

In an example, the determination module 214 can perform a plurality of capacitance measurements associated with specific portions of the sensing region 120 as "capacitive pixels" to create a "capacitive image" or "capacitive frame." A capacitive pixel of a capacitive image represents a location within the sensing region 120 in which a capacitive coupling can be measured using sensing elements of the sensor electrode pattern 202. For example, a capacitive pixel can correspond to a transcapacitive coupling between a sensor electrode $210_{1,1}$ and another sensor electrode $210_{1,2}$ affected by input object(s). In another example, a capacitive pixel can correspond to an absolute capacitance of a sensor electrode 210. The determination module 214 can determine an array of capacitive coupling changes using the resulting signals obtained by the sensor module 212 to produce an x-by-y array of capacitive pixels that form a capacitive image. The capacitive image can be obtained using transcapacitive sensing (e.g., transcapacitive image), or obtained using absolute capacitive sensing (e.g., absolute capacitive image). In this manner, the processing system 110 can capture a capacitive image that is a snapshot of the response measured in relation to input object(s) in the sensing region 120. A given capacitive image can include all of the capacitive pixels in the sensing region, or only a subset of the capacitive pixels.

In another example, the determination module 214 can perform a plurality of capacitance measurements associated with a particular axis of the sensing region 120 to create a "capacitive profile" along that axis. For example, the determination module 214 can determine an array of absolute capacitive coupling changes along an axis defined by the sensor electrodes $210_{X,Y}$ and/or the sensor electrodes $210_{X+1,Y}$ to produce capacitive profile(s). The array of capacitive coupling changes can include a number of points less than or equal to the number of sensor electrodes along the given axis.

Measurement(s) of capacitance by the processing system 110, such as capacitive image(s) or capacitive profile(s), enable the sensing of contact, hovering, or other user input with respect to the formed sensing regions by the sensor electrode pattern 202. The determination module 214 can utilize the measurements of capacitance to determine positional information with respect to a user input relative to the sensing regions formed by the sensor electrode pattern 202. The determination module 214 can additionally or alternatively use such measurement(s) to determine input object size and/or input object type.

Traditional grid sensor patterns have typically consisted of sensor electrodes arranged in rows and columns for capacitive sensing using a Cartesian grid configuration. However, such sensors may not perform well when used on a round shape, such as wearable devices (e.g., smartwatches) and other electronic devices which have become popular in the marketplace. Accordingly, there is a demand for sensor electrode patterns for circular sensor outlines that make better use of the round geometry.

Figure 3:
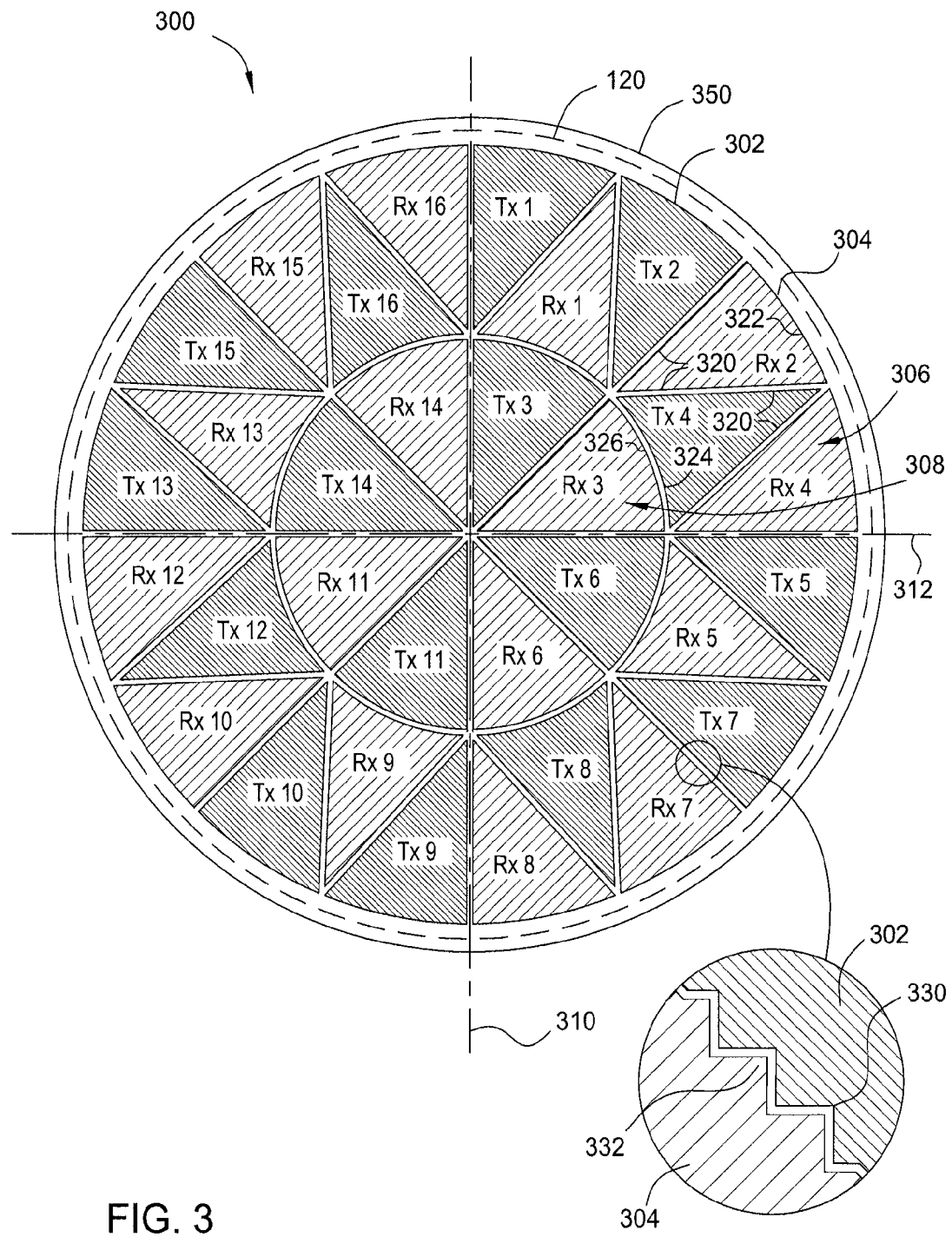
FIG. 3 schematically illustrates a sensor electrode pattern that can be used to sense an input object in sensing region of a capacitive sensor, according to one embodiment of the present disclosure.

FIG. 3 schematically illustrates a sensor electrode pattern 300 that can be used to sense an input object in sensing region 120 of a capacitive sensor, according to one embodiment of the present disclosure. The sensor electrode pattern 300 includes a plurality of sensor electrodes which may be separated into a first plurality of sensor electrodes 302 and a second plurality of sensor electrodes 304. The different subsets of sensor electrodes are distinguished in FIG. 3 using different fill patterns. Each of the sensor electrodes 302, 304 may be coupled to one or more components of the processing system 110 (such as the sensor module 212 of FIG. 1) via dedicated traces or other routing disposed between the plurality of sensor electrodes 302, 304. For sake of discussion, the sensor electrodes 302 are labelled as transmitter electrodes Tx 1 to Tx 16, and the sensor electrodes 304 are labelled as receiver electrodes Rx 1 to Rx 16, although other numbers of sensor electrodes may be used.

In one embodiment, the plurality of sensor electrodes 302, 304 are all disposed on a single layer of a substrate 350. For example, the plurality of sensor electrodes 302, 304 and the associated conductive routing traces may form a substantially transparent layer, made of materials such as indium tin oxide (ITO) and/or thin, barely visible wires. In one embodiment, the plurality of sensor electrodes 302, 304 are disposed as a substantially transparent layer on a top surface of a color filter glass of a display device.

In one or more embodiments, the sensor electrodes 302, 304 are arranged in a symmetric circular pattern. The sensor electrodes 302, 304 are arranged within the circular pattern such that the sensor electrodes 302, 304 are symmetric along a first (vertical) axis 310. Such symmetry divides the sensor electrode pattern 300 into halves. In some embodiments, the sensor electrodes 302, 304 may be further arranged in the symmetric circular pattern that is also symmetric along a second (horizontal) axis 312, which is orthogonal to the vertical axis 310. This additional symmetric effectively divides the sensor electrode pattern 300 into quarters. The symmetrical properties of the sensor electrode pattern 300 enable a connected processing system (such as the processing system 110) to use simplified logic for determining positional information based on resulting signals obtained from the sensor electrodes. That is, the processing system 110 can use the same logic for determining positional information for a single quarter or half, but applied with a rotation for the other quarters or half.

In one embodiment, the sensor electrodes 302, 304 of the sensor electrode pattern 300 may be arranged in an inner circle 308 of sensor electrodes and an outer ring 306 of sensor electrodes disposed radially outward from the inner circle 308 of sensor electrodes. In the embodiment depicted, the inner circle 308 is comprised of eight sensor electrodes (i.e., Tx 3, Rx 3, Tx 6, Rx 6, Tx 11, Rx 11, Tx 14, and Rx 14), and the outer ring 306 is comprised of twenty-four sensor electrodes (i.e., Tx 1, Rx 1, Tx 2, Rx 2, Tx 4, Rx 4, Tx 5 and so forth).

In one or more embodiments, each sensor electrode in the pattern 300 has a surface area substantially equal to the other sensor electrodes in the pattern. The relatively uniform area of the sensor electrodes provides for a more consistent performance during absolute capacitive sensing. The sensor electrodes in the pattern 300 may be arranged in a tiling configuration of alternating sensor electrodes 302 ("transmitter electrodes") and sensor electrodes 304 ("receiver electrodes") such that each sensor electrode is surrounded by and shares a border with sensor electrodes of the other type. For example, the sensor electrode Rx 1 is adjacently positioned next to sensor electrodes Tx 1 and Tx 2 (of the inner circle 308), and Tx 3 (of the outer ring 306). In another example, the sensor electrode Tx 3 is adjacently positioned next to sensor electrodes Rx 1, Rx 3, and Rx 14.

The geometric design of the sensor electrode pattern 300 is selected and arranged to obtain a substantially equal surface area among sensor electrodes. In some embodiments, each sensor electrode 302, 304 may have a wedge-like shape comprised of two macroscopically straight line edges and a macroscopically curved edge. In the embodiment shown, each sensor electrode 302, 304 in the outer ring 306 have two macroscopically straight line edges 320 and either a macroscopically convex edge 322 or a macroscopically concave edge 324. All the concave edges 324 of sensor electrodes 302, 304 form an inner circumference of the outer ring 306, while the convex edges 326 of the sensor electrodes 302, 304 disposed in the outer ring 306 form an outer circumference of the outer ring 306. Each sensor electrode 302, 304 in the inner circle 308 have two macroscopically straight line edges 320 and a macroscopically convex edge 326, which taken together form an outer circumference of the inner circle 308. The convex edges 326 of sensor electrodes in the inner circle 308 adjoin the concave edges 324 of the sensor electrodes in the outer ring 306.

The term "macroscopically" used herein represents that the sensor electrode pattern 300 is depicted as a generalized geometric pattern. It should be recognized by one skilled in the art that each sensor electrodes may be configured to interleave or be interdigitated with each other to maximize the length of adjacent edges of the sensor electrodes to improve the capacitive coupling between the electrodes. As depicted in the inset in FIG. 3, a sensor electrode 302 may have an electrode shape that includes a plurality of recessed regions 332 in which corresponding protruding regions 330 of a second type of sensor electrode (e.g., sensor electrode 304) is disposed. The sensor electrode 302 may likewise have protruding regions which are disposed within recessed regions of other sensor electrodes. The increased length of adjacent edges can optimize the ratio of user input signal relative to the direct coupling (e.g. of interference) of an input into either electrode. Other various shapes and geometric configurations may be used to interleave or interdigitate adjacent sensor electrodes. A "macroscopically" straight edge of a sensor electrode refers to a substantially straight edge that a sensor electrode would have but for the interdigitations and other features made along that edge of the sensor electrode. Similarly, a "macroscopically" curved edge of a sensor electrode refers to a substantially curved edge that a sensor electrode would have but for the interdigitations and other features made along that edge of the sensor electrode.

As discussed above, the processing system 110 can operate the sensor electrodes 302, 304 according to a plurality of excitation schemes, including excitation scheme(s) for mutual capacitance sensing ("transcapacitive sensing") and/or self-capacitance sensing ("absolute capacitive sensing"). In a transcapacitive excitation scheme, a processing system 110 (of FIG. 1) can use groups of the sensor electrodes in the sensor electrode pattern 300 to detect presence of an input object via transcapacitive sensing. The sensor module 212 can drive at least one of the sensor electrodes 302 with a transmitter signal (the sensor electrodes 302 are "transmitter electrodes"), and can receive a resulting signal from sensor electrodes 304 that share a border with the driven sensor electrode 302 (the sensor electrodes 304 are "receiver electrodes"). In other embodiments, sensor electrodes 304 may be transmitter electrodes and sensor electrodes 302 may be receiver electrodes. The determination module 214 uses the resulting signals to determine transcapacitive measurements and form capacitive images.

In an absolute capacitive sensing scheme, a processing system 110 can use at least one sensor electrode 302, 304 to detect the presence of an input object via absolute capacitive sensing. A sensor module 212 can measure voltage, charge, or current on sensor electrode(s) 302, 304 to obtain resulting signals indicative of a capacitance between the sensor electrode(s) and an input object. The determination module 214 uses the resulting signals to determine absolute capacitive measurements. The input device 100 may be configured to operate in any one of the schemes described above. The input device 100 may also be configured to switch between any two or more of the schemes described above.

Figure 4:
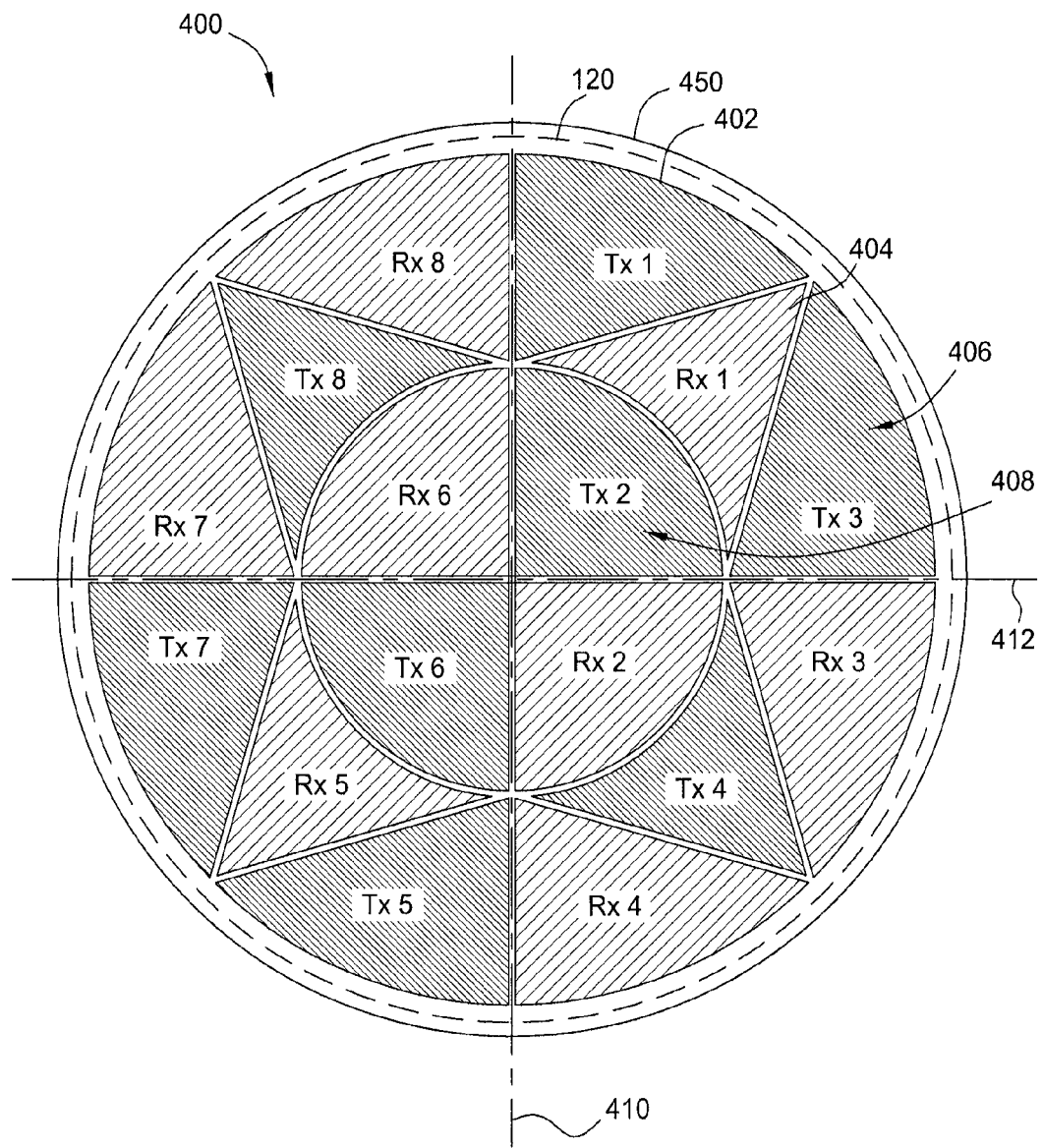
FIG. 4 schematically illustrates another embodiment of the sensor electrode pattern of FIG. 3.

FIG. 4 schematically illustrates another embodiment of a sensor electrode pattern 400 that can be used to sense an input object in sensing region 120 of a capacitive sensor, according to another embodiment of the present disclosure. The sensor electrode pattern 400 is configured similar to the sensor electrode pattern 300, except having a simplified, reduced configuration of sensor electrodes. The sensor electrode pattern 400 includes a plurality of sensor electrodes which may be separated into a first and second subsets of sensor electrodes 402, 404. The different subsets of sensor electrodes are distinguished in FIG. 4 using different fill patterns. Each of the sensor electrodes 402, 404 may be coupled to one or more components of the processing system 110 (such as the sensor module 212 of FIG. 1) via dedicated traces or other routing disposed between the plurality of sensor electrodes 402, 404.

As shown in FIG. 4, the sensor electrodes 402 have been labelled as transmitter electrodes Tx 1 to Tx 8, and the sensor electrodes 404 are labelled as receiver electrodes Rx 1 to Rx 8, although other numbers of sensor electrodes may be used. In one embodiment, the sensor electrodes 402, 404 of the sensor electrode pattern 400 can be arranged in an inner circle 408 of sensor electrodes and an outer ring 406 disposed radially outward from the inner circle 408. In the example shown, the inner circle 408 is comprised of four sensor electrodes (i.e., Tx 2, Rx 2, Tx 6, Rx 6), and the outer ring 406 is comprised of twelve sensor electrodes (i.e., Tx 1, Rx 1, Tx 3, Rx 3, Tx 4, Rx 4, Tx 5, Rx 5, Tx 7, Rx 7, Tx 8, Rx 8, and so forth).

In one or more embodiments, the sensor electrodes of the sensor electrode pattern 400 are arranged in a symmetric circular pattern. The sensor electrodes 402, 404 are arranged within the circular pattern such that the sensor electrodes 402, 404 are symmetric along a first (vertical) axis 410 and also symmetric along a second (horizontal) axis 412. Each sensor electrode in the pattern 400 has a surface area substantially equal to the other sensor electrodes in the pattern. The sensor electrodes in the pattern 400 may be arranged in a tiling configuration of alternating sensor electrodes 402 ("transmitter electrodes") and sensor electrodes 404 ("receiver electrodes") such that each sensor electrode is surrounded by sensor electrodes of the other type.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A capacitive sensor, comprising:
a sensor substrate; and
a plurality of sensor electrodes disposed on a first side of the sensor substrate, wherein the plurality of sensor electrodes comprises a plurality of first sensor electrodes defining an inner circle within a symmetric circular pattern and further comprising a plurality of second sensor electrodes defining an outer ring within the symmetric circular pattern and disposed radially outward from the inner circle;
wherein the plurality of sensor electrodes are configured to sense an input object in a sensing region of the capacitive sensor;
wherein the plurality of sensor electrodes are arranged in a tiling configuration in which the first plurality of sensor electrodes and the second plurality of sensor electrodes each have an alternating pattern of first and second types of sensor electrodes; and
wherein each sensor electrode of the plurality of first sensor electrodes and the plurality of second sensor electrodes has a substantially equal surface area.

2. The capacitive sensor of claim 1, wherein the symmetric circular pattern is symmetric along a first axis and along a second axis orthogonal to the first axis.

3. The capacitive sensor of claim 1, wherein each of the first sensor electrodes and second sensor electrodes defines two macroscopically straight line edges and one macroscopically curved edge.

4. The capacitive sensor of claim 1, wherein each of the first sensor electrodes defines a macroscopically convex edge, and each of the second sensor electrodes defines at least one of a macroscopically convex edge and a macroscopically concave edge.

5. The capacitive sensor of claim 1, wherein the capacitive sensor comprises a touch screen and the plurality of sensor electrodes are disposed on a display device.

6. The capacitive sensor of claim 1, wherein the first side of the sensor substrate comprises a top surface of a color filter of a display device.

7. The capacitive sensor of claim 1, wherein within the tiling configuration, at least one electrode of the first type is bordered by at least two other sensor electrodes of the second type, the at least two other sensor electrodes of the second type including at least one of the plurality of first sensor electrodes within the inner circle and at least one of the plurality of second sensor electrodes within the outer ring.

8. The capacitive sensor of claim 7, wherein the at least one electrode of the first type defines a perimeter, wherein the at least two other sensor electrodes of the second type substantially surround the perimeter.

9. The capacitive sensor of claim 7, wherein each of the plurality of first sensor electrodes is bordered by at least two other sensor electrodes of the second type.

10. A capacitive sensor device comprising:
a sensor substrate;
a plurality of sensor electrodes disposed on a first side of the sensor substrate and are arranged in a symmetric circular pattern, wherein the plurality of sensor electrodes are configured to sense an input object in a sensing region of the capacitive sensor device;
wherein each of the plurality of sensor electrodes has a substantially equal surface area; and
a processing system communicatively coupled to the plurality of sensor electrodes and configured to:
perform mutual capacitive sensing by driving a sensing signal on a first subset of the plurality of sensor electrodes and receiving a resulting signal on a second subset of the plurality of sensor electrodes, wherein each sensor electrode of the first subset shares a border with one or more sensor electrodes of the second subset; and
perform absolute capacitive sensing with the plurality of sensor electrodes.

11. The capacitive sensor device of claim 10, wherein the symmetric circular pattern is symmetric along a first axis and along a second axis orthogonal to the first axis.

12. The capacitive sensor device of claim 10, wherein each of the plurality of sensor electrodes defines two macroscopically straight line edges and one macroscopically curved edge.

13. The capacitive sensor device of claim 10, wherein the plurality of sensor electrodes comprises:
a plurality of first sensor electrodes defining an inner circle within the symmetric circular pattern; and
a plurality of second sensor electrodes defining an outer ring within the symmetric circular pattern and disposed radially outward from the inner circle.

14. The capacitive sensor device of claim 13, wherein each of the first sensor electrodes defines a macroscopically convex edge, and each of the second sensor electrodes defines at least one of a macroscopically convex edge and a macroscopically concave edge.

15. The capacitive sensor device of claim 13, wherein the plurality of first sensor electrodes and the plurality of second sensor electrodes are each arranged in a tiling configuration having alternating sensor electrodes of the first subset and the second subset.

16. The capacitive sensor device of claim 10, wherein the first side of the sensor substrate comprises a top surface of a color filter of a display device.

17. A processing system for a touch screen device, the processing system comprising:
a sensor module communicatively coupled to a plurality of sensor electrodes, wherein the plurality of sensor electrodes are disposed on a first side of a sensor substrate and are arranged in a symmetric circular pattern, wherein the plurality of sensor electrodes are configured to sense an input object in a sensing region of the touch screen device, wherein each of the plurality of sensor electrodes has a substantially equal surface area, wherein the sensor module is configured to:
drive a sensing signal on a first subset of the plurality of sensor electrodes;
receive a resulting signal on a second subset of the plurality of sensor electrodes; and
wherein each sensor electrode of the first subset shares a border with one or more sensor electrodes of the second subset.

18. The processing system of claim 17, wherein the symmetric circular pattern is symmetric along a first axis and along a second axis orthogonal to the first axis.

19. The processing system of claim 17, wherein each of the plurality of sensor electrodes defines two macroscopically straight line edges and one macroscopically curved edge.

20. The processing system of claim 17, wherein the plurality of sensor electrodes comprises:
a plurality of first sensor electrodes defining an inner circle within the symmetric circular pattern; and
a plurality of second sensor electrodes defining an outer ring within the symmetric circular pattern disposed radially outward from the inner circle.

21. The processing system of claim 20, wherein each of the first sensor electrodes defines a macroscopically convex edge, and each of the second sensor electrodes defines at least one of a macroscopically convex edge and a macroscopically concave edge.

22. The processing system of claim 20, wherein the plurality of first sensor electrodes and the plurality of second sensor electrodes are each arranged in a tiling configuration having alternating sensor electrodes of the first subset and second subset.

* * * * *